United States Patent [19]

Valko et al.

[11] Patent Number: 5,760,107
[45] Date of Patent: Jun. 2, 1998

[54] CATIONIC RESIN AND CAPPED POLYISOCYANATE CURING AGENT SUITABLE FOR USE IN ELECTRODEPOSITION

[75] Inventors: Joseph T. Valko, Pittsburgh, Pa.; Philippe Faucher, Paris, France; Richard F. Karabin, Ruffs Dale, Pa.; Thomas C. Moriarity, Wexford, Pa.; V. Eswarakrishnan, Allison Park, Pa.; Ellor J. Van Buskirk, Wexford, Pa.; Gregory J. McCollum, Gibsonia, Pa.; Raphael O. Kollah, Pittsburgh, Pa.

[73] Assignee: PPG Industries, Inc., Pittsburgh, Pa.

[21] Appl. No.: 724,343

[22] Filed: Oct. 1, 1996

Related U.S. Application Data

[62] Division of Ser. No. 334,712, Nov. 4, 1994, Pat. No. 5,582,704.

[51] Int. Cl.$^6$ .................... C08L 63/00; C08L 63/02
[52] U.S. Cl. .................... 523/404; 523/415; 525/528; 528/45; 528/73; 427/386; 204/500; 204/501; 204/502; 204/504; 204/505; 204/506
[58] Field of Search ............. 204/500, 506, 204/501, 502, 504, 505; 523/404, 415, 528, 45, 73; 427/386

[56] References Cited

U.S. PATENT DOCUMENTS

| | | | |
|---|---|---|---|
| 3,793,278 | 2/1974 | De Bona | 260/29.2 EP |
| 3,799,854 | 3/1974 | Jerabek | 204/181 |
| 3,922,253 | 11/1975 | Jerabek et al. | 260/77.5 TB |
| 3,928,156 | 12/1975 | Wismer et al. | 204/181 |
| 3,935,087 | 1/1976 | Jerabek et al. | 204/181 |
| 3,959,106 | 5/1976 | Bosso et al. | 204/181 |
| 3,984,299 | 10/1976 | Jerabek | 204/181 |
| 4,036,795 | 7/1977 | Tominaga | 260/18 PN |
| 4,104,147 | 8/1978 | Marchetti et al. | 204/181 C |
| 4,134,866 | 1/1979 | Tominaga et al. | 260/18 PN |
| 4,148,772 | 4/1979 | Marchetti et al. | 260/29.2 EP |
| 4,278,580 | 7/1981 | Schmolzer et al. | 260/29.2 EP |
| 4,340,523 | 7/1982 | Hazan | 524/504 |
| 4,352,842 | 10/1982 | Kooymans et al. | 427/385.5 |
| 4,420,574 | 12/1983 | Moriarity et al. | 523/404 |
| 4,423,166 | 12/1983 | Moriarity et al. | 523/414 |
| 4,427,805 | 1/1984 | Kooijmans et al. | 523/417 |
| 4,432,850 | 2/1984 | Moriarity et al. | 204/181 C |
| 4,435,559 | 3/1984 | Valko | 528/73 |
| 4,468,307 | 8/1984 | Wismer et al. | 204/181 C |
| 4,504,606 | 3/1985 | Kordomenos | 523/400 |
| 4,536,558 | 8/1985 | Kordomenos | 528/100 |
| 4,699,955 | 10/1987 | Kordomenos et al. | 525/440 |
| 4,931,157 | 6/1990 | Valko et al. | 204/181.7 |
| 4,933,056 | 6/1990 | Corrigan et al. | 204/181.7 |
| 5,074,979 | 12/1991 | Valko et al. | 204/181.7 |
| 5,096,556 | 3/1992 | Corrigan et al. | 204/181.7 |
| 5,147,906 | 9/1992 | Nishida et al. | 523/410 |
| 5,283,124 | 2/1994 | Fujibayashi et al. | 523/404 |
| 5,416,137 | 5/1995 | Turnquist et al. | 524/504 |

FOREIGN PATENT DOCUMENTS

| | | |
|---|---|---|
| 0 017 215 | 10/1980 | European Pat. Off. . |
| 0 135 811 | 4/1985 | European Pat. Off. . |
| 0 462 496 | 12/1991 | European Pat. Off. . |

OTHER PUBLICATIONS

USSN 08/334,711, filed Nov. 1994, entitled Cationic Resin Containing Capped Isocyanate Groups Suitable for Use in Electrodeposition, Valko et al.

"Blocked Isocyanates" from Progress in Organic Coatings, by Z. W. Wicks, Jr., 3 (1975) pp. 73–99.

General Motors Engineering Standards, Materials and Processes–Procedures–Chip Resistance of Coating (GM9508P), Jul. 1991, pp. 1–8.

Database WPIL 93–365 441, JP 5–271 583 A (abstract) to Kansai Paint Co. Ltd.

*Primary Examiner*—Frederick Krass
*Attorney, Agent, or Firm*—Kenneth J. Stachel

[57] ABSTRACT

An electrodepositable composition is provided comprising:

(A) a non-gelled cationic resin which is derived from a polyepoxide and which contains in the resin molecule cationic salt groups and active hydrogen groups selected from aliphatic hydroxyl and primary and secondary amino; and present as a separate component (B) a fully capped polyisocyanate curing agent containing substantially no free isocyanate groups. The electrodepositable composition contains from about 0.02 to 1.0 milliequivalents phenolic hydroxyl groups per gram of resin solids, and from about 0.1 to 2.0 milliequivalents beta-hydroxy ester groups per gram of resin solids. The composition provides excellent corrosion resistance when electrodeposited over steel substrates, and does not require lead in the formulation nor the use of a conventional chrome rinse for the steel substrate pretreatment before electrodeposition.

22 Claims, No Drawings

CATIONIC RESIN AND CAPPED POLYISOCYANATE CURING AGENT SUITABLE FOR USE IN ELECTRODEPOSITION

This is a divisional of U.S. patent application Ser. No. 08/334,712, filed Nov. 4, 1994, now U.S. Pat. No. 5,582,704.

BACKGROUND OF THE INVENTION

1. Field of the Invention

The present invention relates to cationic resins and to their use in electrodeposition, and particularly to cationic resins and capped polyisocyanate curing agents and to their use in electrodeposition.

2. Brief Description of the Prior Art

The application of a coating by electrodeposition involves depositing a film-forming composition to an electrically conductive substrate under the influence of an applied electrical potential. Electrodeposition has gained prominence in the coatings industry because in comparison with nonelectrophoretic coating methods, electrodeposition provides higher paint utilization, outstanding corrosion resistance, and low environmental contamination. Early attempts at commercial electrodeposition processes used anionic electrodeposition, where the workpiece being coated served as the anode. However, in 1972, cationic electrodeposition was introduced commercially. Since that time, cationic electrodeposition has become increasingly popular and today is the most prevalent method of electrodeposition. Throughout the world, more than 80 percent of all motor vehicles manufactured are given a primer coating by cationic electrodeposition.

To maximize corrosion resistance over steel substrates, cationic electrodeposition compositions are conventionally formulated with lead as either a pigment or as a soluble lead salt. In addition, the steel substrate is usually pretreated before electrodeposition with a phosphate conversion coating and rinsed with a chromic acid solution (chrome rinse) after pretreatment. However, lead and chromium are very toxic materials. The lead is often present in the effluent from electrodeposition processes and chromium is present in the effluent from pretreatment processes, and these metals need to be removed and disposed of safely, which may require expensive treatment processes.

It would be desirable to provide an electrodepositable composition having excellent corrosion resistance, which does not require lead nor the use of a chrome rinse.

SUMMARY OF THE INVENTION

In accordance with the present invention, an electrodepositable composition is provided comprising:

(A) a cationic resin which is derived from a polyepoxide and which contains in the resin molecule cationic salt groups and active hydrogen groups selected from aliphatic hydroxyl and primary and secondary amino; and present as a separate component (B) a fully capped polyisocyanate curing agent containing substantially no free isocyanate groups. The electrodepositable composition further contains from about 0.02 to 1.0 milliequivalents (meq) phenolic hydroxyl groups per gram of resin solids, and from about 0.1 to 2.0 meq beta-hydroxy ester groups per gram of resin solids.

It has been discovered, surprisingly, that free phenolic hydroxyl groups and beta-hydroxy ester groups present in the composition provide improved corrosion resistance over steel substrates. The phenolic hydroxyl groups are particularly effective in providing corrosion resistance over phosphated (pretreated) steel, and the beta-hydroxy ester groups are effective in providing corrosion resistance over bare or unphosphated steel. The improvement in corrosion resistance is such that electrodepositable compositions free of lead can be formulated. In addition, where the steel substrate has been phosphated, chromic acid rinses can be eliminated.

DETAILED DESCRIPTION

The phenolic hydroxyl groups and beta-hydroxy ester groups present in the composition may be present in any combination in component (A) and/or component (B). By this is meant that both groups may be present in component (A), both groups may be present in component (B), both groups may be present in both components, or one or both types of groups may be present in component (A) while the other (or both) is in component (B). In addition, components (A) and (B) need not contain the phenolic hydroxyl groups and beta-hydroxy ester groups present in the composition. The phenolic hydroxyl groups and beta-hydroxy ester groups may be present in a third and/or fourth component different from (A) and (B).

The cationic resin of component (A) is derived from a polyepoxide, which may be chain extended by reacting together a polyepoxide and a polyhydroxyl group-containing material selected from alcoholic hydroxyl group-containing materials and phenolic hydroxyl group-containing materials to chain extend or build the molecular weight of the polyepoxide. The resin contains cationic salt groups and active hydrogen groups selected from aliphatic hydroxyl and primary and secondary amino.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

The polyepoxide preferably has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane.

The preferred polyepoxides have molecular weights ranging from about 180 to 500, preferably from about 186 to 350. Epoxy group-containing acrylic polymers can also be used, but they are not preferred.

Examples of polyhydroxyl group-containing materials used to chain extend or increase the molecular weight of the polyepoxide (i. e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157.

Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

Component (A) also contains cationic salt groups. The cationic salt groups are preferably incorporated into the resin by reacting the epoxy group-containing resinous reaction product prepared as described above with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50° to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. Sulfamic acid is preferred. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water: Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably the reaction temperature is in the range of about 60° to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in forming component (A) of the composition of the present invention. Examples of these resins and their method of preparation are described in U.S. Pat. Nos. 3,793,278 to DeBona and 3,959,106 to Bosso et al.

The extent of cationic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient cationic character that the dispersed particles will migrate toward and electrodeposit on a cathode when an electrical potential is set up between an anode and a cathode immersed in the aqueous dispersion.

Generally, component (A) of the electrodepositable composition of the present invention is non-gelled and contains from about 0.1 to 3.0, preferably from about 0.1 to 0.7 milliequivalents of cationic salt group per gram of resin solids. The number average molecular weight of component (A) preferably ranges from about 2,000 to about 15,000, more preferably from about 5,000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The active hydrogens associated with component (A) include any active hydrogens which are reactive with isocyanates within the temperature range of about 93° to 204° C., preferably about 121° to 177 ° C. Typically, the active hydrogens are selected from the group consisting of hydroxyl and primary and secondary amino, including mixed groups such as hydroxyl and primary amino. Preferably, component (A) will have an active hydrogen content of about 1.7 to 10 milliequivalents, more preferably about 2.0 to 5 milliequivalents of active hydrogen per gram of resin solids.

Beta-hydroxy ester groups may be incorporated into component (A) by ring opening 1,2-epoxide groups of the polyepoxide with a material which contains at least one carboxylic acid group. The carboxylic acid functional material may be a monobasic acid such as dimethylolpropionic acid, malic acid, and 12-hydroxystearic acid; a polybasic acid such as a simple dibasic acid or the half ester reaction products of a polyol and the anhydride of a diacid, or a combination thereof. If a monobasic acid is used, it preferably has hydroxyl functionality associated with it. Suitable polybasic acids include succinic acid, adipic acid, citric acid, and trimellitic acid. If a polybasic acid is used, care must be taken to prevent gelation of the reaction mixture by limiting the amount of polybasic acid and/or by additionally reacting a monobasic acid. Suitable half ester reaction products include, for example, the reaction product of trimethylolpropane and succinic anhydride at a 1:1 equivalent ratio. Suitable hydroxyl group-containing carboxylic acids include dimethylolpropionic acid, malic acid, and 12-hydroxystearic acid. Dimethylolpropionic acid is preferred.

Phenolic hydroxyl groups may be incorporated into component (A) by using a stoichiometric excess of the polyhydric phenol during initial chain extension of the polyepoxide. Although a stoichiometric excess of phenolic hydroxyl groups to epoxy is used, there still remains unreacted epoxy groups in the resulting resinous reaction product for subsequent reaction with the cationic salt group former. It is believed that a portion of polyhydric phenol remains unreacted. Therefore, where it is mentioned that component (A) contains unreacted phenolic groups, a resinous mixture comprising a resin having active hydrogen groups such as aliphatic hydroxyl and primary or secondary amino groups and cationic salt groups in admixture with a polyhydric phenol is meant to be included.

When component (A) contains both phenolic hydroxyl groups and beta-hydroxy ester groups, the phenolic hydroxyl groups may be incorporated simultaneously with the beta-hydroxy ester groups, or sequentially before or after. Preferably, however, the phenolic hydroxyl groups are incorporated into component (A) after incorporation of the beta-hydroxy ester groups by reacting a stoichiometric excess of polyhydric phenol with the resulting polyepoxide. Once again, despite the stoichiometric excess of phenolic hydroxyl groups to epoxy being used, unreacted epoxy groups remain in the resulting resinous reaction product for subsequent reaction with the cationic salt group former.

The polyisocyanate curing agent of component (B) is a fully capped polyisocyanate with substantially no free isocyanate groups. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol or phenolic compound may be used as a capping agent for the polyisocyanate in component (B) of the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam, and amines such as dibutyl amine.

Beta-hydroxy ester groups may be incorporated into component (B) by reacting the isocyanate groups of the polyisocyanate with the hydroxyl group of a hydroxyl group-containing carboxylic acid such as dimethylolpropionic acid, malic acid, and 12-hydroxystearic acid. Dimethylolpropionic acid is preferred. The acid group on the hydroxyl group-containing carboxylic acid is reacted (either before or after reaction of the isocyanate group with the hydroxyl group) with an epoxy functional material such as a monoepoxide or polyepoxide, ring opening a 1,2-epoxide group on the epoxy functional material to form the beta-hydroxy ester group. Examples of monoepoxides which may be used include ethylene oxide, propylene oxide, 1,2-butylene oxide, 1,2-pentene oxide, styrene oxide, and glycidol. Other examples of monoepoxides include glycidyl esters of monobasic acids such as glycidyl acrylate, glycidyl methacrylate, glycidyl acetate, glycidyl butyrate; linseed glycidyl ester and glycidyl ethers of alcohols and phenols such as butyl glycidyl ether and phenylglycidyl ether.

Examples of polyepoxides which may be used to form the beta-hydroxy ester groups in component (B) are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A.

Phenolic hydroxyl groups may be incorporated into component (B) by capping the isocyanate groups with phenolic materials having an aliphatic and a phenolic hydroxyl group such as 2-hydroxybenzyl alcohol. The isocyanate group will react preferentially with the aliphatic hydroxyl group. It is also possible to incorporate phenolic hydroxyl groups into component (B) by capping the isocyanate groups with a hydroxyl functional polyepoxide such as a polyglycidyl ether of a cyclic polyol or polyhydric phenol, which is further reacted with a stoichiometric excess of a polyhydric phenol.

Beta-hydroxy ester groups may alternatively be incorporated into the electrodepositable composition of the present invention by a third component (C) which is different from (A) and (B). Such a component may be a reaction product of an epoxy functional material, such as a polyepoxide, typically those mentioned above, and a carboxylic acid functional material. Suitable carboxylic acid functional materials include dimethylolpropionic acid, tartaric acid, or the product of a polyol or polyamine reacted with the anhydride of a polybasic acid. Examples include ethylene glycol or ethylene diamine reacted with a succinic anhydride.

Component (C) may further include free phenolic hydroxyl groups. Typically these may be incorporated by reacting a portion of the epoxy functional material with a carboxylic acid functional material as mentioned above and then reacting the remaining epoxy groups with a stoichiometric excess of a polyhydric phenol.

Free phenolic hydroxyl groups may also be incorporated into the composition of the present invention by a fourth component (D) which is different than the other components. Suitable components include polymers and/or copolymers of hydroxyl functional styrenic monomers such as poly-p-hydroxy styrene, and a polyepoxide as mentioned above reacted with a stoichiometric excess of a polyhydric phenol, a phenol-formaldehyde condensation product, or polymers and/or copolymers of hydroxyl functional styrenic monomers such as poly-p-hydroxy styrene.

Typically, component (A) is present in the electrodepositable composition in amounts of 15 to 85, preferably 40 to 70 percent by weight based on weight of resin solids. Component (B) is present in the electrodepositable composition in amounts of 15 to 85, preferably 30 to 60 percent by weight based on weight of resin solids. Component (C) is present in the electrodepositable composition in amounts up to 30 percent by weight based on weight of resin solids. Component (D) is present in the electrodepositable composition in amounts up to 30 percent by weight based on weight of resin solids. Typically there is sufficient polyisocyanate present in the composition of the present invention to provide about 0.1 to about 1.2 capped isocyanate groups for each active hydrogen in the resin of component (A); i. e., aliphatic hydroxyl and primary and secondary amino.

The amount of a functional group present in a composition, expressed as milliequivalents of functional group per gram of resin solid (meq/g), is calculable as follows: for an amount x of a component being prepared from an amount y of functional material having an equivalent weight z, $$\frac{\text{meq functional group}}{\text{g resin}} = 1000 \times \frac{y/z}{x};$$

for example, the amount of amino groups present in 1000 g of a resin prepared from 300 g of an amine having an amino equivalent weight of 500 (primary and secondary amines being considered monofunctional for the purpose of this calculation) is:

$$\frac{\text{meq amino group}}{\text{g resin}} = 1000 \times \frac{300/500}{1000} = 0.6 \text{ meq/g}.$$

The respective amounts of each functional group in each component are added together to yield the total amount of each functional group in the overall composition.

The free phenolic hydroxyl groups are present in the electrodepositable composition in amounts of about 0.02 to 1.0 milliequivalents, preferably about 0.07 to 0.30 milliequivalents per gram of resin solids, the unreacted phenolic hydroxyl groups calculated as

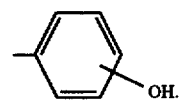

The beta-hydroxy ester groups are present in the electrodepositable composition in amounts of about 0.1 to 2.0 milliequivalents, preferably about 0.3 to 0.8 milliequivalents per gram of resin solids, the beta-hydroxy ester groups calculated as

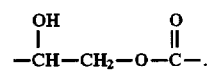

The resin of component (A) and the fully capped polyisocyanate curing agent of component (B) in the composition of the present invention are used in an electrodeposition process in the form of an aqueous dispersion. By "dispersion" is meant a two-phase transparent, translucent, or opaque aqueous resinous system in which the resin, curing agent, pigment, and water insoluble materials are the dispersed phase and water and water soluble materials comprise the continuous phase. The dispersed phase has an average particle size less than about 10 microns, preferably less than 5 microns. The aqueous dispersion preferably contains at least about 0.05 and usually about 0.05 to 50 percent by weight resin solids, depending on the particular end use of the dispersion.

The aqueous dispersion may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as 4-methyl-2-pentanone (MIBK) and isophorone. The coalescing solvent is usually present in an amount up to about 40 percent by weight, preferably ranging from about 0.05 to 25 percent by weight based on total weight of the aqueous medium.

The electrodepositable composition of the present invention may further contain pigments and various other optional additives such as catalysts, plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically about 1 to 20 percent by weight-based on weight of resin solids.

Curing catalysts, preferably tin catalysts such as dibutyltin dilaurate and dibutyltin oxide, are usually present in the electrodepositable composition of the present invention. When present, they are used in amounts of about 0.05 to 5 percent by weight based on weight of resin solids.

Suitable pigments include, for example, iron oxides, carbon black, coal dust, titanium dioxide, talc and barium sulfate. Lead pigments may be used; however, the electrodepositable composition of the present invention provides outstanding corrosion resistance for steel substrates without the use of lead pigments. The pigment content of the aqueous dispersion, generally expressed as the pigment to resin (or binder) ratio (P/B) is usually about 0.1:1 to 1:1.

In the process of electrodeposition the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the electrodepositable composition of the present invention. Steel substrates are preferred because the composition provides significant corrosion protection to these substrates. Although it is conventional to pretreat the steel substrate with a phosphate conversion coating followed by a chromic acid rinse, the composition of the present invention may be applied to steel substrates which have not been given a chrome rinse and still provides excellent corrosion resistance.

After deposition, the coating is heated to cure the deposited composition. The heating or curing operation is usually carried out at a temperature in the range of from 120° to 250° C., preferably from 120° to 190° C. for a period of time ranging from 10 to 60 minutes. The thickness of the resultant film is usually from about 10 to 50 microns.

The composition can be applied by means other than electrodeposition including brushing, dipping, flow coating, spraying and the like, but it is most often applied by electrodeposition.

The invention will further be described by reference to the following examples. Unless otherwise indicated, all parts and percentages are by weight.

EXAMPLE I
(Control)

This example describes the preparation of a cationic electrodeposition bath containing a main vehicle (i. e., a cationic resin and capped polyisocyanate curing agent) with no beta-hydroxy ester or phenolic hydroxyl functionality.

A main vehicle was prepared from the following ingredients:

| Ingredients | Weight (grams) |
| --- | --- |
| EPON 828[1] | 680.9 |
| Bisphenol A-ethylene oxide adduct (1:6 molar ratio) | 249.9 |
| Bisphenol A | 199.2 |
| Methyl isobutyl ketone (MIBK) | 67.59 |
| Benzyldimethyl amine (BDMA) | 3.74 |
| Crosslinker[2] | 1194.79 |
| Diketimine[3] | 75.53 |
| N-methyl ethanolamine | 65.73 |

[1] Polyglycidyl ether of Bisphenol A having an epoxy equivalent weight of 188, available from Shell Oil and Chemical Co.

[2] A polyisocyanate crosslinker having no beta-hydroxy ester or phenolic hydroxyl functionality was prepared from the following ingredients:

| Ingredients | Weight (grams) |
| --- | --- |
| Polyisocyanate[a] | 1320 |
| Methyl isobutyl ketone (MIBK) | 688.43 |
| Trimethylol propane | 134.19 |
| Dibutyltin dilaurate (DBTDL) | 1.0 |
| Butyl CARBITOL[b] | 1135.61 |

[a] Polymeric isocyanate available from Dow Chemical Co. as PAPI 2940
[b] Monobutyl ether of diethylene glycol available from Dow Chemical Co.
The polyisocyanate and 626.47 g of MIBK were charged to a reaction flask under a nitrogen atmosphere. The reaction mixture was heated to 80° C. and the trimethylol propane was added. The temperature of the reaction mixture was adjusted to 105° C. and held until the isocyanate equivalent weight of the reaction mixture was 297. The mixture was cooled to 65° C. and the DBTDL was added. Over the next thirty minutes, the butyl CARBITOL was added dropwise at 65° C. followed by 61.96 g of MIBK. The reaction mixture was held at 80° C. until infrared analysis indicated complete consumption of the isocyanate.

[3] Diketimine derived from diethylene triamine and methyl isobutyl ketone (MIBK) (73% solids in MIBK)

A reaction vessel was charged with the EPON 828, Bisphenol A-ethylene oxide adduct, Bisphenol A and 59.1 g MIEK. This mixture was heated under a nitrogen blanket to 143° C. 1 gram of BDMA was then added and the reaction mixture allowed to exotherm to a temperature of about 190° C. The reaction mixture was allowed to reflux at 185°–190° C. for thirty minutes and any water present was removed. The reaction mixture was then cooled to 160° C., held for thirty minutes, and cooled further to 145° C. At this point, 2.74 g of BDMA was added and the mixture held at 145° C. until the epoxy equivalent weight of the solids was about 1060. The crosslinker, the diketimine, N-methyl ethanolamine, and 8.49 g of MIBK were added in succession. A temperature of 125° C. was established and maintained for an hour. The resin mixture (2198.72 grams) was dispersed in aqueous medium by adding it to a mixture of 56.81 g sulfamic acid and 1309.48 g deionized water. The dispersion was further thinned with 356.46 g deionized water, 435.67 g deionized water, and 1244.77 g deionized water in stages and vacuum stripped to remove organic solvent to yield a dispersion having a solids content of 42 percent.

A pigment paste was prepared from the following ingredients:

| Ingredients | Weight (grams) | Resin Solids (grams) | Pigment Solids (grams) |
| --- | --- | --- | --- |
| Pigment grinding vehicle[1] | 123.0 | 66.4 | — |
| Deionized water | 212.9 | — | — |

-continued

| Ingredients | Weight (grams) | Resin Solids (grams) | Pigment Solids (grams) |
|---|---|---|---|
| Titanium dioxide[2] | 294.4 | — | 294.4 |
| Clay[3] | 172.5 | — | 172.5 |
| Carbon Black[4] | 12.7 | — | 12.7 |
| Catalyst paste[5] | 184.5 | 23.7 | 59.3 |

[1]The pigment grinding vehicle was prepared as described in U.S. Pat. No. 4,423,166, col. 16, lines 21–49.
[2]Available from E. I. Du Pont de Nemours and Co. as TIPURE R-900.
[3]Available from Engelhard Minerals and Chemicals Corp. as ASP-200.
[4]Available from the Columbian division of Cities Service Co. as Raven 410.
[5]Dispersion of di-n-butyltin oxide using the pigment grinding vehicle described in U.S. Pat. No. 4,423,166, col. 16, lines 21–49.

The pigment paste was sand milled to a Hegman reading of 7.

A cationic electrodeposition bath was prepared from the following ingredients:

| Ingredients | Weight (grams) | Resin Solids (grams) | Pigment Solids (grams) |
|---|---|---|---|
| Main vehicle prepared above | 975.0 | 428.0 | — |
| Co-resin 1[1] | 145.2 | 48.6 | — |
| Co-resin 2[2] | 52.9 | 9.7 | — |
| Pigment paste prepared above | 101.1 | 9.1 | 54.5 |
| Deionized water | 1225.8 | — | — |

[1]An adduct generally in accordance with U.S. Pat. No. 4,423,166 was prepared from a Bisphenol A epichlorohydrin-type epoxy resin having an epoxy equivalent weight of 500, and a polyoxyalkylene-polyamine (JEFFAMINE D-2000 from Texaco Chemical Co.).
[2]A cationic microgel prepared as generally described in Examples A and B of U.S. Pat. No. 5,096,556, with the exception that acetic acid instead of lactic acid was used to disperse the soap of Example A, ethylene glycol butyl ether instead of MIBK was used as a solvent in the soap of Example A, and EPON 828 solution was added after stripping rather than before in Example B. The resin had a final solids content of 18.3%.

EXAMPLE II

This example describes the preparation of a cationic electrodeposition bath containing a cationic resin with phenolic hydroxyl functionality and a crosslinker with beta-hydroxy ester functionality.

A main vehicle was prepared from the following ingredients:

| Ingredients | Weight (grams) |
|---|---|
| EPON 828 | 307.38 |
| Bisphenol A-ethylene oxide adduct (1:6 molar ratio) | 125.75 |
| Bisphenol A | 148.66 |
| Beta-hydroxy ester functional crosslinker[1] | 762.84 |
| Diketimine | 34.04 |
| N-methyl ethanolamine | 29.50 |

[1]A polyisocyanate crosslinker having beta-hydroxy ester functionality was prepared from the following mixture of ingredients:

| Ingredients | Parts by Weight |
|---|---|
| PAPI 2940 | 1320 |
| Methyl isobutyl ketone (MIBK) | 823.08 |
| Dibutyltin dilaurate (DBTDL) | 1.32 |
| Butyl CARBITOL | 811.15 |
| Dimethylol propionic acid | 342.06 |
| BDMA | 7.42 |
| Phenyl glycidyl ether | 459.55 |

The polyisocyanate, 723.08 g of MIBK, and the DBTDL were charged to a reaction flask under a nitrogen atmosphere. The reaction mixture was heated to 50° C. and the butyl CARBITOL was added over approximately two hours while the temperature was maintained at 50–60° C. The temperature of the reaction mixture was held at 65° C. until the isocyanate equivalent weight of the reaction mixture was 571. 100 g MIBK and the dimethylol propionic acid were then added. The reaction mixture was held at 95° C. until infrared analysis indicated complete consumption of the isocyanate. The BDMA and phenyl glycidyl ether were then added and the mixture held at 120° C. until its acid value was less than two.

A reaction vessel was charged with the EPON 828, Bisphenol A-ethylene oxide adduct, Bisphenol A and the crosslinker. This mixture was heated under a nitrogen blanket to 70° C. The diketimine and N-methyl ethanolamine were then added with stirring and the temperature of the reaction mixture was gradually increased to about 120° C. over three hours and then held for two hours. The reaction mixture was then cooled to 90° C. The resin mixture was dispersed in aqueous medium by adding a mixture of 29.24 g sulfamic acid and 29.24 g deionized water. Heating was stopped and the dispersion was further thinned with 753.66 g deionized water, 493.40 g deionized water, and 499.89 g deionized water in stages to yield a dispersion having a solids content of 36.1 percent.

The main vehicle contained 0.129 milliequivalents of phenolic hydroxyl per gram of resin solids and 0.417 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 1185.6 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1015.2 | — | — |

EXAMPLE III

This example describes the preparation of a cationic electrodeposition bath containing a cationic resin with beta-hydroxy ester functionality and a crosslinker with phenolic hydroxyl functionality.

A main vehicle was prepared from the following ingredients:

| Ingredients | Weight (grams) |
|---|---|
| EPON 828 | 325.30 |
| Bisphenol A | 100.00 |
| MIBK | 53.42 |
| Ethyltriphenylphosphonium iodide | 0.25 |
| Dimethylol propionic acid | 60 |
| Bisphenol A-ethylene oxide adduct (1:6 molar ratio) | 147.36 |
| Diketimine | 99.7 |

-continued

| Ingredients | |
|---|---|
| N-methyl ethanolamine | 8.69 |
| Phenolic hydroxyl functional crosslinker[1] | 1120.6 |

[1]A polyisocyanate crosslinker having phenolic hydroxyl functionality was prepared from the following mixture of ingredients:

| Ingredients | Parts by Weight |
|---|---|
| EPON 828 | 282.00 |
| Bisphenol A | 342.00 |
| MIBK | 1228.94 |
| Ethyltriphenylphosphonium iodide | 0.34 |
| Dibutyltin dilaurate (DBTDL) | 1.32 |
| Butyl CARBITOL | 1378.70 |
| PAPI 2940 | 1320 |

The EPON 828, Bisphenol A, and 32.84 g of MIBK were charged to a reaction flask under a nitrogen atmosphere. The reaction mixture was heated to 125° C. and the ethyltriphenylphosphonium iodide was added. The reaction mixture exothermed to a temperature of 151° C. The mixture was then held at 150–155° C. for three hours. The mixture was then cooled and 1196.10 g MIBK was added slowly. The reaction mixture was left to cool overnight and at room temperature (25° C.) the DBTDL and butyl CARBITOL were added. The reaction mixture was then heated to 41° C., followed by addition of the PAPI 2940 over 90 minutes during which time the reaction mixture exothermed to 85° C. The temperature of the reaction mixture was increased to 110° C. and held until infrared analysis indicated complete consumption of the isocyanate.

A reaction vessel was charged with the EPON 828, Bisphenol A, and the MIBK. This mixture was heated under a nitrogen blanket to 120° C. The ethyltriphenylphosphonium iodide was then added and the temperature of the reaction mixture was held at 125° C. for three hours 15 minutes, after which time the epoxy equivalent weight of the solids was 1239. The Bisphenol A-ethylene oxide adduct, diketimine, and N-methyl ethanolamine were added and the mixture held at 125° C. for one hour. The crosslinker was then added and the reaction mixture was cooled to 95° C. The resin mixture was dispersed in aqueous medium by adding a mixture of 44.91 g sulfamic acid and 44.91 g deionized water. Heating was stopped and the dispersion was further thinned with 780.52 g deionized water, 664.01 g deionized water, 627.24 g deionized water, and 1000 g deionized water in stages and vacuum stripped to remove organic solvent to yield a dispersion having a solids content of 38 percent. The dispersion settled upon standing but could be redispersed with agitation.

The main vehicle contained 0.249 milliequivalents of phenolic hydroxyl per gram of resin solids and 0.300 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 1126.3 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1074.5 | — | — |

EXAMPLE IV

This example describes the preparation of a cationic electrodeposition bath containing a cationic resin with no beta-hydroxy ester or phenolic hydroxyl functionality and a crosslinker with both beta-hydroxy ester and phenolic hydroxyl functionality.

A main vehicle was prepared from the following ingredients:

| Ingredients | Weight (grams) |
|---|---|
| EPON 828 | 340.45 |
| Bisphenol A | 99.6 |
| Bisphenol A-ethylene oxide adduct (1:6 molar ratio) | 121.45 |
| Methyl isobutyl ketone (MIBK) | 29.55 |
| Benzyldimethyl amine (BDMA) | 1.87 |
| Crosslinker[1] | 1084.25 |
| Diketimine | 37.87 |
| N-methyl ethanolamine | 32.86 |

[1]A phenolic polyester was first prepared from the following ingredients:

| Ingredients | Weight (grams) |
|---|---|
| EPON 828 | 376 |
| Bisphenol A | 228 |
| Dimethylol propionic acid | 134.14 |
| Methyl isobutyl ketone (MIBK) | 164.04 |
| Ethyltriphenylphosphonium iodide | 0.23 |

The first three ingredients and 82.02 g MIBK were charged to a reaction flask under a nitrogen atmosphere. The reaction mixture was heated to 125° C. and the ethyltriphenylphosphonium iodide was added. The reaction mixture exothermed and was held at 150–155° C. for three hours. The mixture cooled to 130° C. and 82.02 g MIBK was added slowly, allowing the mixture to cool to 50° C.

A polyisocyanate crosslinker having both beta-hydroxy ester and phenolic hydroxyl functionality was prepared from the following mixture of ingredients:

| Ingredients | Parts by Weight |
|---|---|
| Butyl CARBITOL | 689.48 |
| Phenolic polyester prepared above | 645.87 |
| Dibutyltin dilaurate (DBTDL) | 0.66 |
| MIBK | 294.97 |
| PAPI 2940 | 660 |

The first four ingredients were charged to a reaction flask under a nitrogen atmosphere. The reaction mixture was heated to 40° C. and the PAPI 2940 was added over about 60 minutes during which time the reaction mixture exothermed to about 97° C. The temperature of the reaction mixture was increased to 110° C. and held until infrared analysis indicated complete consumption of the isocyanate.

A reaction vessel was charged with the EPON 828, Bisphenol A-ethylene oxide adduct, Bisphenol A and 29.55 g MIBK. This mixture was heated under a nitrogen blanket to 143° C. 0.5 gram of BDMA was then added and the reaction mixture allowed to exotherm to a temperature of about 190° C. The reaction mixture was allowed to reflux at 185°–190° C. for thirty minutes and any water present was removed. The reaction mixture was then cooled to 160° C., held for thirty minutes, and cooled further to 145° C. At this point, 1.37 g of BDMA was added and the mixture held at 145° C. until the epoxy equivalent weight of the solids was about 1060. The crosslinker, the diketimine, and N-methyl ethanolamine were added in succession. A temperature of 125° C. was established and maintained for an hour. The resin mixture was cooled to 90° C. and dispersed in aqueous medium by adding a mixture of 32.55 g sulfamic acid and 32.55 g deionized water. The dispersion was further thinned with 817.86 g deionized water, 262.9 g deionized water, 321.32 g deionized water, and 918.07 g deionized water in stages and vacuum stripped to remove organic solvent to yield a dispersion having a solids content of about 41 percent.

The main vehicle contained 0.147 milliequivalents of phenolic hydroxyl per gram of resin solids and 0.147 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 1050.8 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1150.0 | — | — |

EXAMPLE V

This example describes the preparation of a cationic electrodeposition bath containing a cationic resin with phenolic hydroxyl functionality, a crosslinker with no beta-hydroxy ester or phenolic hydroxyl functionality, and an additive with beta-hydroxy ester functionality.

A main vehicle was prepared from the following ingredients:

| Ingredients | Weight (grams) |
|---|---|
| EPON 828 | 307.38 |
| Bisphenol A-ethylene oxide adduct (1:6 molar ratio) | 125 |
| Bisphenol A | 148.66 |
| Crosslinker of Example I | 946.3 |
| Diketimine | 41.43 |
| N-methyl ethanolamine | 36 |
| Beta-hydroxy ester functional additive[1] | 372.23 |

[1]An additive having beta-hydroxy ester functionality was prepared from the following mixture of ingredients:

| Ingredients | Weight (grams) |
|---|---|
| Diglycolamine | 299.88 |
| Toluene | 103.32 |
| Octenyl succinic anhydride | 630 |
| EPON 828 | 568.32 |

The diglycolamine and toluene were charged to a reaction vessel under a nitrogen atmosphere. The octenyl succinic anhydride was added to the contents of the vessel under nitrogen over about 5 hours keeping the temperature below 60° C. The mixture was then held at 40° C. for 30 minutes, yielding an "acid/amide intermediate". To a suitable reaction vessel was charged the EPON 828 and 516.6 g. of the above "acid/amide intermediate". The contents of the vessel were heated under nitrogen to 120° C. and a mild exotherm to 126° C. occurred. The mixture was then held at 117° C. for about 1 hour. The mixture was cooled to 100° C. and another 516.6 g. of the above "acid/amide intermediate" was added. The mixture was heated to 120° C. and held at 113-120° C. for 5 hours.

A reaction vessel was charged with the EPON 828, Bisphenol A, Bisphenol A-ethylene oxide adduct, and crosslinker. The contents of the vessel were heated under nitrogen to 42° C., then the diketimine and N-methyl ethanolamine were added with stirring. The temperature was gradually increased to 120° C. over about 3 hours and then held at 120° C. for 2 hours. The beta-hydroxy ester functional additive was then added and mixed for 5 minutes. The resin mixture (1600 grams) was dispersed in aqueous medium by adding it to a mixture of 28.88 g. of sulfamic acid and 988 g. deionized water. The dispersion was further thinned with 581.53 g deionized and 913.83 g deionized water in stages and vacuum stripped to remove organic solvent to yield a dispersion having a solids content of 43.28 percent.

The main vehicle contained 0.15 milliequivalents of phenolic hydroxyl per gram of resin solids and 0.403 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 988.5 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1212.3 | — | — |

EXAMPLE VI

This example describes the preparation of a cationic electrodeposition bath containing a cationic resin with no beta-hydroxy ester or phenolic hydroxyl functionality, a crosslinker with phenolic hydroxyl functionality, and an additive with beta-hydroxy ester functionality.

A main vehicle was prepared from the following ingredients:

| Ingredients | Weight (grams) |
|---|---|
| EPON 828 | 238.32 |
| Bisphenol A-ethylene oxide adduct (1:6 molar ratio) | 85.02 |
| Bisphenol A | 69.72 |
| MIBK | 20.69 |
| BDMA | 1.31 |
| Crosslinker 1[1] | 519.27 |
| Diketimine | 26.44 |
| N-methyl ethanolamine | 23.01 |
| Beta-hydroxy ester functional additive of Example V | 293.19 |
| Phenolic hydroxyl functional crosslinker[2] | 242.24 |

[1]A polyisocyanate crosslinker having no beta-hydroxy ester or phenolic hydroxyl functionality was prepared from the following mixture of ingredients:

| Ingredients | Weight (grams) |
|---|---|
| PAPI 2940 | 1319 |
| Methyl isobutyl ketone (MIBK) | 352.81 |
| Dibutyltin dilaurate (DBTDL) | 1.0 |
| Butyl CARBITOL | 1622.3 |

The first three ingredients were charged to a reaction vessel under a nitrogen atmosphere. The contents of the vessel were heated under nitrogen to 30° C. and the butyl CARBITOL was added over approximately 5 hours maintaining temperature below 70° C. The temperature of the reaction mixture was increased to 100° C. and held until infrared analysis indicated complete consumption of the isocyanate.
[2]A polyisocyanate crosslinker having phenolic hydroxyl functionality was prepared from the following mixture of ingredients:

| Ingredients | Weight (grams) |
|---|---|
| Butyl CARBITOL | 340.68 |
| 2-hydroxy benzyl alcohol | 111.73 |
| Methyl isobutyl ketone (MIBK) | 212.46 |

| | |
|---|---|
| Dibutyltin dilaurate (DBTDL) | 0.3 |
| PAPI 2940 | 396 |

The first four ingredients were charged to a reaction vessel under a nitrogen atmosphere. The contents of the vessel were heated under nitrogen to 40° C. and the PAPI 2940 was added over approximately 3 hours and 20 minutes during which time the temperature increased to 81° C. The temperature of the reaction mixture was then increased to and held at 100° C. until infrared analysis indicated complete consumption of the isocyanate.

A reaction vessel was charged with the EPON 828, Bisphenol A-ethylene oxide adduct, Bisphenol A and MIBK. This mixture was heated under a nitrogen blanket to 143° C. 0.35 gram of BDMA was then added and the reaction mixture allowed to exotherm to a temperature. of about 190° C. The reaction mixture was allowed to reflux at 185°–190° C. for thirty minutes and any water present was removed. The reaction mixture was then cooled to 160° C., held for thirty minutes, and cooled further to 145° C. At this point, 0.96 g of BDMA was added and the mixture held at 145° C. until the epoxy equivalent weight of the solids was about 1060. Crosslinker 1, the diketimine, and N-methyl ethanolamine were added in succession. A temperature of 125° C. was established and maintained for an hour. The mixture was cooled to 120° C. and the additive and phenolic hydroxyl functional crosslinker were added. The resin mixture (1300 grams) was dispersed in aqueous medium by adding it to a mixture of 19.52 g sulfamic acid and 850.13 g deionized water. The dispersion was further thinned with 482.14 g deionized water, and 756.66 g deionized water in stages and vacuum stripped to remove organic solvent to yield a dispersion having a solids content of 40.32 percent.

The main vehicle contained 0.15 milliequivalents of phenolic hydroxyl per gram of resin solids and 0.404 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 1062.0 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1138.8 | — | — |

EXAMPLE VII

This example describes the preparation of a cationic electrodeposition bath containing a cationic resin and a crosslinker with no beta-hydroxy ester or phenolic hydroxyl functionality, and two additives; one with beta-hydroxy ester functionality and one with phenolic hydroxyl functionality.

A main vehicle was prepared from the following ingredients:

| Ingredients | Weight (grams) |
|---|---|
| EPON 828 | 258.74 |
| Bisphenol A-ethylene oxide adduct (1:6 molar ratio) | 92.3 |
| Bisphenol A | 75.7 |
| MIBK | 22.46 |
| BDMA | 1.42 |
| Crosslinker of Example I | 835.31 |
| Diketimine | 28.7 |
| N-methyl ethanolamine | 24.98 |
| Phenolic hydroxyl functional additive[1] | 127.96 |
| Beta-hydroxy ester functional additive of Example V | 328.5 |

[1] An additive having phenolic hydroxyl functionality was prepared from the following ingredients:

| Ingredients | Weight (grams) |
|---|---|
| EPON 828 | 752 |
| Bisphenol A | 912 |
| Ethyltriphenylphosphonium iodide | 0.91 |
| MIBK | 554.67 |

The EPON 828 and Bisphenol A were charged to a reaction vessel under a nitrogen atmosphere. The contents of the vessel were heated under nitrogen to 125° C. and the ethyltriphenylphosphonium iodide was added. The reaction mixture exothermed and was held at 160–170° C. for three hours. The mixture was cooled to 130° C. and the MIBK was added slowly. The mixture had a solids content of 75%.

A reaction vessel was charged with the EPON 828, Bisphenol A-ethylene oxide adduct, Bisphenol A and MIBK. This mixture was heated under a nitrogen blanket to 143° C. 0.38 g of BDMA was then added and the reaction mixture allowed to exotherm to a temperature of about 190° C. The reaction mixture was allowed to reflux at 185°–190° C. for thirty minutes and any water present was removed. The reaction mixture was then cooled to 160° C., held for thirty minutes, and cooled further to 145° C. At this point, 1.04 g of BDMA was added and the mixture held at 145° C. until the epoxy equivalent weight of the solids was about 1060. The crosslinker, diketimine, and N-methyl ethanolamine were added in succession. A temperature of 125° C. was established and maintained for an hour. The additives were then added. The resin mixture (1500 grams) was dispersed in aqueous medium by adding it to a mixture of 20.68 g sulfamic acid and 850.47 g deionized water. The dispersion was further thinned with 237.11 g deionized water, 289.81 g deionized water, and 828.02 g deionized water in stages and vacuum stripped to remove organic solvent to yield a dispersion having a solids content of 52.12 percent.

The main vehicle contained 0.15 milliequivalents of phenolic hydroxyl per gram of resin solids and 0.404 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 822.0 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1378.8 | — | — |

EXAMPLE VIII

This example describes the preparation of a cationic electrodeposition bath containing a cationic resin and a crosslinker with no beta-hydroxy ester or phenolic hydroxyl functionality, and two additives; one with beta-hydroxy ester functionality and one with phenolic hydroxyl functionality.

A main vehicle having a solids content of 45.79 percent was prepared generally in accordance with Example VII above, except that in place of the phenolic hydroxyl functional additive, 24.17 g of poly p-hydroxy styrene (number average molecular weight of 6,300, available from Hoechst-Celanese) was added to the reaction mixture; 731.14 g of the crosslinker of Example 1 was used and 287.29 g of the beta-hydroxy ester functional additive of Example V was used.

The main vehicle contained 0.15 milliequivalents of phenolic hydroxyl per gram of resin solids and 0.404 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
| --- | --- | --- | --- |
| Main vehicle prepared above | 930.4 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1270.4 | — | — |

EXAMPLE IX

This example describes the preparation..of a cationic electrodeposition bath containing a cationic resin with phenolic hydroxyl functionality and a crosslinker with beta-hydroxy ester functionality.

A main vehicle was prepared from the following ingredients:

| Ingredients | Weight (grams) |
| --- | --- |
| EPON 828 | 213.7 |
| Bisphenol A | 95.2 |
| Bisphenol A-ethylene oxide adduct (1:6 molar ratio) | 113 |
| Beta-hydroxy ester functional crosslinker[1] | 798.2 |
| Diketimine | 30.5 |
| N-methyl ethanolamine | 26.6 |

[1]A polyisocyanate crosslinker having beta-hydroxy ester functionality was prepared from the following mixture of ingredients:

| Ingredients | Parts by Weight |
| --- | --- |
| PAPI 2940 | 1106 |
| MIBK | 762.3 |
| Butyl CARBITOL | 950.2 |
| Dimethylol propionic acid | 247.9 |
| EPON 828 | 230.2 |
| Ethyltriphenylphosphonium Iodide | 2.1 |

The PAPI 2940 and 557.6 g MIBK were charged to a reaction vessel under a nitrogen atmosphere. The reaction mixture was heated to 40° C. and the butyl CARBITOL was added over approximately 2 hours maintaining 55–65° C. The mixture was held at 65° C. until the isocyanate equivalent weight was 1015. At that point, 174 g. of dimethylolpropionic acid was added and the mixture was heated to 95° C. The mixture was then held at 95° C. until the infrared spectrum of the mixture indicated complete consumption of the isocyanate. The solids content (110° C./ 1 hour) was found to be 80.7% and the acid value was 25.45. Of this material, 1350 g was transferred to a reaction vessel and 230.2 g. of EPON 828, 73.9 g. of dimethylolpropionic acid and 204.7 g. of MIBK were also added. The contents of the vessel were heated to 110° C., at which point the ethyltriphenylphosphonium iodide was added and the temperature was raised to 125° C. The mixture was held at 125° C. until the acid number was 0.94. At this point, the Gardner-Holdt viscosity at 60% solids in 1-methoxy-2-propanol was U, the epoxy equivalent was infinite, and the solids content was 76.8%.

A reaction vessel was charged with the EPON 828, Bisphenol A, Bisphenol A-ethylene oxide adduct, and the crosslinker. This mixture was heated under a nitrogen blanket to 70° C. At that point, the diketimine and N-methylethanolamine were added. The temperature was adjusted to 105° C. and held there for 3 hours, at which point the epoxy equivalent was found to be infinite and the Gardner-Holdt viscosity at 50% solids in 1-methoxy-2-propanol was D. The temperature was reduced to 95° C. and a solution of 26.3 g. of sulfamic acid in 105.2 g. of deionized water was added. An additional amount of deionized water, totaling 1479.1, was added in portions. The dispersion was heated to 60°–65° C. and subjected to reduced pressure to strip off MIBK and water. After the solvent strip, the solids content was determined to be 47.8%.

The main vehicle contained 0.126 milliequivalents of phenolic hydroxyl per gram of resin solids and 0.24 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
| --- | --- | --- | --- |
| Main vehicle prepared above | 892.0 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 1308.8 | — | — |

EXAMPLE X

This example describes the preparation of a cationic electrodeposition bath containing a cationic resin with beta-hydroxy ester and phenolic hydroxyl functionality, and a crosslinker with no beta-hydroxy ester or phenolic hydroxyl functionality.

A main vehicle was prepared from the following ingredients:

| Ingredients | Weight (grams) |
| --- | --- |
| Hexahydrophthalic anhydride (HHPA) | 925.2 |
| Triethylamine | 6.1 |
| Bisphenol A-ethylene oxide adduct | 1457.4 |

| Ingredients | Weight (grams) |
|---|---|
| (1:6 molar ratio) | |
| MIBK | 119.3 |
| EPON 828 | 430.28 |
| Bisphenol A | 138.63 |
| Crosslinker of Example I | 775.65 |
| 3-dimethylamino-1-propylamine | 18.49 |
| N-methyl ethanolamine | 27.60 |
| Diethanolamine | 38.64 |

A diacid was prepared by charging a suitable reaction vessel with the hexahydrophthalic anhydride, triethylamine and 728.7 g of the Bisphenol A-ethylene oxide adduct. Under a nitrogen blanket, the temperature of this mixture increased to about 70° C., at which point an additional 728.7 g. of the above Bisphenol A-ethylene oxide adduct was added. The mixture was then held at 125°–132° C. until an infrared spectrum indicated no anhydride peak. At that point, the mixture was cooled to 90° C. and 119.3 g. of MIBK was added.

A portion of the diacid reaction product (167.20 g) was charged to a separate reaction vessel along with the EPON 828, Bisphenol A and the crosslinker. While stirring under a nitrogen blanket, the 3-dimethylamino-1-propylamine, N-methylethanolamine and diethanolamine were added. The mixture was allowed to exotherm to about 118° C., and was held at 117°–120° C. for about 1.5 hours. At this point, the mixture had 0.714 meq. amine per gram and an epoxy equivalent weight of about 34,500, based on solids. The Gardner-Holdt viscosity was S for a 50% solids solution in 1-methoxy-2-propanol. To the mixture was added 40.49 g. of sulfamic acid in 29.0 g. of deionized water. Then a total of 2220.22 g. of deionized water was added gradually. The dispersion was then heated to 60°–65° C. and subjected to reduced pressure to strip off MIBK. The stripped dispersion had a solids content of 32.04%.

The main vehicle contained 0.299 milliequivalents of phenolic hydroxyl per gram of resin solids and 0.281 milliequivalents of beta-hydroxy ester groups per gram of resin solids. Both were calculated values.

A cationic electrodeposition bath was prepared from the following ingredients:

| Ingredients | Weight (grams) | Resin Solids (grams) | Pigment Solids (grams) |
|---|---|---|---|
| Main vehicle prepared above | 1337.5 | 428.0 | — |
| Co-resin 1 of Example I | 145.2 | 48.6 | — |
| Co-resin 2 of Example I | 52.9 | 9.7 | — |
| Pigment paste of Example I | 101.1 | 9.1 | 54.5 |
| Deionized water | 863.3 | — | — |

Untreated cold rolled steel (CRS) panels and two types of zinc phosphate pretreated steel panels were immersed in and electrocoated with the cationic electrodeposition paint baths prepared in Examples I–X at 245 volts for 2 min. at a paint temperature of 85° F. (29° C.). After rinsing with deionized water and air drying, the panels were cured for 30 minutes at 340° F. (171° C.), yielding coatings with a dry film thickness of about 1.0 mil (25.4 microns). The panels were subjected to modifications of the General Motors Corporation Scab Cycle Corrosion test GM9511P, General Motors Corporation Cycle Corrosion test GM9540P, Chrysler Motors Corporation Chip Corrosion test 463PB52-01, and warm salt water resistance testing.

Scab Cycle Corrosion Test

Electrocoated panels were scribed with an "X" and held in an oven at 60° C. for 1 hour. The panels were then held at −25° C. for 30 minutes. The panels were then immersed into a 5% sodium chloride solution at room temperature. Immersion was for 15 minutes, after which the panels were removed from the solution and left at ambient conditions for 1 hour 15 minutes. The panels were placed in a humidity chamber at 85% relative humidity and 60° C. for 22.5 hours.

Panels which were untreated CRS went through a total of 20 salt solution/humidity cycles with high and low temperature holds after every seventh cycle, while panels which were zinc phosphated underwent a total of 25 salt solution/humidity cycles with high and low temperature holds after every seventh cycle. After testing, panels were wiped dry and left at ambient conditions for 30 minutes.

A strip of 3M Scotch Brand 898 tape was firmly applied to the panels over the scribe and then quickly removed. Panels were observed for peeling of the coatings ("creep", measured in millimeters) at the scribe mark and compared to panels coated with ED-5000, an electrodeposition bath which contains lead and which is available from PPG Industries, Inc. The results are reported in Table I below. Positive numbers reflect relative improvement over ED-5000 with respect to millimeters of creep.

TABLE I

| Example | Untreated CRS | CHEMFOS 168 ® DI[1] | BONDERITE 952 ® DI[2] |
|---|---|---|---|
| I (Control) | −3.0 | −2.0 | 0.0 |
| II | −1.5 | 0.0 | −2.0 |
| III | −3.0 | −0.5 | −1.0 |
| IV | −4.0 | 0.0 | −0.5 |
| V | −2.0 | +1.0 | −2.0 |
| VI | −4.0 | +0.5 | −1.0 |
| VII | −3.0 | +0.5 | −0.5 |
| VIII | −4.0 | −1.0 | +1.0 |
| IX | −1.0 | +1.0 | +2.0 |
| X | −2.0 | −1.0 | +1.0 |

[1]Zinc phosphate treated cold rolled steel with a deionized water final rinse, no chromic acid passivation rinse. Zinc phosphate treatment available from PPG Industries, Inc.
[2]Zinc phosphate treated cold rolled steel with a deionized water final rinse, no chromic acid passivation rinse. Available from Advanced Coating Technology, Inc.

The data in Table I indicate that the coatings of Examples II–X offers better scab corrosion protection over CHEMFOS 168® DI than does the control coating of Example I, which has no phenolic hydroxyl or beta-hydroxy ester functionality.

Cycle Corrosion Test

Electrocoated panels were scribed with an "X" and mist sprayed four times with a salt solution containing 0.9% sodium chloride, 0.1% calcium chloride, and 0.25% sodium bicarbonate in deionized water, with a ninety-minute hold at ambient conditions between each sprayout. Panels were then held at 49° C. and 100% relative humidity for eight hours followed by 60° C. and 30% relative humidity for eight hours, completing one test cycle.

Panels which were untreated CRS went through a total of 30 cycles, while panels which were zinc phosphated underwent a total of 40 salt cycles. After testing, panels were wiped dry and left at ambient conditions for 30 minutes. A strip of 3M Scotch Brand 898 tape was firmly applied to the panels over the scribe and then quickly removed. Panels were observed for creep at the scribe mark. The results are reported in Table II below. Numbers reported are the measured creep of the coatings in millimeters (mm).

TABLE II

| Example | Untreated CRS | CHEMFOS 168 ® DI | BONDERITE 952 ® DI |
|---|---|---|---|
| I (Control) | 18.0 | 8.0 | 8.0 |
| II | 16.5 | 6.5 | 7.0 |
| III | 20.5 | 8.0 | 7.0 |
| IV | 17.5 | 8.0 | 9.0 |
| V | 18.0 | 6.5 | 6.5 |
| VI | 19.0 | 7.0 | 7.5 |
| VII | 21.0 | 7.5 | 7.0 |
| VIII | 19.5 | 7.0 | 7.5 |
| IX | 16.5 | 6.5 | 7.0 |
| X | 20.0 | 8.0 | 8.0 |

The data in Table II indicate that the coatings of Examples II–X offers equivalent or better cycle corrosion protection in nearly every instance over CHEMFOS 168® DI and BONDERITE 952® DI than does the control coating of Example I, which has no phenolic hydroxyl or beta-hydroxy ester functionality.

Chip Corrosion Test

Electrocoated panels were coated with a polyester enamel top coat available from PPG Industries, Inc., as DHT-5920. The coated panels were then baked to cure the top coats and subjected to the Chip Corrosion Test, wherein coated and cured panels were scribed with an "X" and impacted with about 415 g of steel shot fed at 30 psi from a Stone Hammer blow tester (model Erichson® 508, available from Zormco Corp.). The panels were then immersed into a 5% sodium chloride solution at room temperature. Immersion was for 15 minutes, after which the panels were removed from the solution and left at ambient conditions for 1 hour 15 minutes. The panels were placed in a humidity chamber at 85% relative humidity and 60° C. for 22.5 hours.

Panels which were untreated CRS went through a total of 15 salt solution/humidity cycles with steel shot impacting after every seventh cycle, while panels which were zinc phosphated underwent a total of 25 salt solution/humidity cycles with steel shot impacting after every seventh cycle. After testing, panels were wiped dry and left at ambient conditions for 30 minutes. A strip of 3M Scotch Brand 898 tape was firmly applied to the panels over the scribe and then quickly removed. Panels were observed for creep at the scribe mark. The results are reported in Table III below. Numbers reported are the measured creep of the coatings in millimeters (mm).

TABLE III

| Example | Untreated CRS creep/chip rating[1] | CHEMFOS 168 ® DI | BONDERITE 952 ® DI |
|---|---|---|---|
| I (Control) | 22.5/0.5 | 7.5/4.0 | 3.5/5.5 |
| II | 7.0/0.5 | 3.0/4.5 | 2.0/4.5 |
| III | 6.0/0.5 | 4.0/7.0 | 2.5/6.0 |
| IV | 18.5/0.0 | 4.5/6.5 | 2.5/7.0 |
| V | 25.0/0.5 | 2.5/5.0 | 2.5/4.0 |
| VI | 25.0/0.5 | 2.5/5.5 | 6.0/5.0 |
| VII | 21.0/0.0 | 1.5/6.0 | 3.0/4.0 |
| VIII | 8.5/0.5 | 4.0/7.0 | 7.5/4.5 |
| IX | 4.0/1.0 | 2.0/4.5 | 2.5/3.5 |
| X | 17.5/0.5 | 6.0/6.0 | 2.5/5.5 |

[1]Chip rating reflects a visual rating compared to standards wherein 10 is best and 0 is worst.

The data in Table III indicate that the coatings of Examples II–X offers better chip protection and significantly better corrosion protection over CHEMFOS 168® DI than does the control coating of Example I, which has no phenolic hydroxyl or beta-hydroxy ester functionality.

Warm Salt Water Resistance Test

Electrocoated panels were scribed with an "X" and immersed vertically into a 5% sodium chloride solution maintained at 55° C. Immersion was for 240 hours, after which the panels were removed from the solution, rinsed with water, and dried. A strip of 3M Scotch Brand 898 tape was firmly applied to the panels over the scribe and then quickly removed. Panels were observed for creep at the scribe mark. The results are reported in Table IV below. Numbers reported are the measured creep of the coatings in millimeters (mm).

TABLE IV

| Example | Untreated CRS | CHEMFOS 168 ® DI | BONDERITE 952 ® DI |
|---|---|---|---|
| I (Control) | 23.5 | 13.5 | 9.5 |
| II | >35.0 | 6.0 | 5.5 |
| III | 26.0 | 5.5 | 5.0 |
| IV | 30.0 | 6.5 | 4.5 |
| V | 24.0 | 4.5 | 5.5 |
| VI | 32.0 | 9.5 | 9.0 |
| VII | 27.0 | 5.5 | 7.5 |
| VIII | 32.0 | 4.5 | 6.5 |
| IX | 9.5 | 6.5 | 5.5 |
| X | >35.0 | 7.5 | 5.5 |

The data in Table IV indicate that the coatings of Examples II–X offers significantly better corrosion protection with respect to salt water resistance over CHEMFOS 168® DI and BONDERITE 952® DI than does the control coating of Example I, which has no phenolic hydroxyl or beta-hydroxy ester functionality.

We claim:
1. An electrodepositable composition comprising:
   (A) a cationic resin which is derived from a polyepoxide and which contains in the resin cationic salt groups and active hydrogen groups selected from aliphatic hydroxyl or primary or secondary amino; and present as a separate components
   (B) a fully capped polyisocyanate curing agent containing substantially no free isocyanate groups;

said electrodepositable composition containing from about 0.02 to 1.0 milliequivalents phenolic hydroxyl groups calculated as

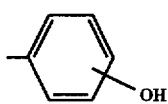

per gram of resin solids, and from about 0.1 to 2.0 milliequivalents beta-hydroxy ester groups calculated as

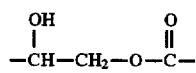

per gram of resin solids which is formed from ring opening a 1,2-epoxy group-containing material with a carboxylic acid; and wherein the phenolic hydroxyl groups and the beta-hydroxy ester groups are each separately present in one of the components selected from the group consisting of: (A), (B), optionally a separate component (C), and optionally a separate component (D), where (C) and (D) are different from (A) and (B) and from each other, wherein when the phenolic hydroxyl groups are present in component (A) they are produced by reaction of a polyhydric phenol with a polyepoxide with chain extension by a polyhydroxyl group-containing material where the polyhydric phenol is present in stoichiometric excess, and wherein when the phenolic hydroxyl groups are present in component (B) they are produced by capping the isocyanate groups of the polyisocyanate with materials selected from the group consisting of: i) materials having an aliphatic and phenolic hydroxyl group, and ii) a hydroxyl functional epoxide which is further reacted with a stoichiometric excess of a polyhydric phenol.

2. The electrodepositable composition of claim 1 in which the phenolic hydroxyl groups are present in component (A).

3. The electrodepositable composition of claim 1 in which the beta-hydroxy ester groups are present in component (A).

4. The electrodepositable composition of claim 1 in which the phenolic hydroxyl groups are present in component (B).

5. The electrodepositable composition of claim 1 in which the beta-hydroxy ester groups are present in component (B).

6. The electrodepositable composition of claim 1 in which the phenolic hydroxyl groups and the beta-hydroxy ester groups are present in component (B).

7. The electrodepositable composition of claim 1 in which the phenolic hydroxyl groups are present in a separate component (C) which is different from components (A) and (B).

8. The electrodepositable composition of claim 1 in which the beta-hydroxy ester groups are present in a separate component (C) which is different from components (A) and (B).

9. The electrodepositable composition of claim 1 in which the phenolic hydroxyl groups and the beta-hydroxy ester groups are both present in a separate component (C) which is different from components (A) and (B).

10. The electrodepositable composition of claim 1 in which the phenolic hydroxyl groups are present in a separate component (C) and the beta-hydroxy ester groups are present in a separate component (D); (C) and (D) being different from (A) and (B) and from one another.

11. The electrodepositable composition of claim 1 in which the phenolic hydroxyl groups are in component (A) or (B) and the beta-hydroxy ester groups are in a separate component (C) which is different from components (A) and (B).

12. The electrodepositable composition of claim 1 in which the beta-hydroxy ester groups are present in components (A) and (B) and the phenolic hydroxyl groups are in a separate component (C) which is different from components (A) and (B).

13. The electrodepositable composition of claim 1 in which the phenolic hydroxyl groups are derived from a polyhydric phenol.

14. The electrodepositable composition of claim 13 in which the polyhydric phenol is Bisphenol A.

15. The electrodepositable composition of claim 1 in which the carboxylic acid is a hydroxyl group-containing carboxylic acid.

16. The electrodepositable composition of claim 15 in which the hydroxyl group-containing carboxylic acid is dimethylolpropionic acid.

17. The electrodepositable composition of claim 1 in which the 1,2-epoxy group-containing material is a polyepoxide.

18. The composition of claim 1 in which the electrodepositable composition further comprises a separate component (C) and a separate component (D) and the phenolic hydroxyl groups are present in one and the beta-hydroxy ester groups are present in the other; and (C) and (D) are different from (A) and (B) and from one another.

19. The composition of claim 1 in which the phenolic hydroxyl groups are free unreacted phenolic hydroxyl groups in the electrodepositable composition.

20. The composition of claim 1 wherein the beta-hydroxy ester groups are present in component (B) through reaction of isocyanate groups of the polyisocyanate with a hydroxyl group of a hydroxyl group-containing carboxylic acid and reaction of the acid group of the reacted hydroxyl group-containing carboxylic acid with an epoxy functional material to have ring opening of the 1,2-epoxide group of the epoxy functional material to form the beta-hydroxy ester groups.

21. The composition of claim 18 wherein the electrodepositable composition has present on a percent by weight basis of the weight of resin solids an amount of component (A) from 15 to 85, of component (B) from 15 to 85, of component (C) up to 30, and of component (D) up to 30.

22. The composition of claim 21 wherein in the electrodepositable composition the polyisocyanate is present in component (B) in an amount to provide 0.1 to about 1.2 capped isocyanate groups for each active hydrogen in the resin of component (A), and component (A) has an equivalent ratio of reactants of epoxy to polyhydroxyl of from about 1.00:0.75 to 1.00:2.00 and has about 0.1 to 3.0 milliequivalent of cationic salt group per gram of resin solids.

* * * * *

UNITED STATES PATENT AND TRADEMARK OFFICE
CERTIFICATE OF CORRECTION

PATENT NO. : 5,760,107
DATED : June 2, 1998
INVENTOR(S) : Valko et al.

It is certified that error appears in the above-identified patent and that said Letters Patent are hereby corrected as shown below:

Please amend the following claim:

Claim 1, column 24, line 61, please delete the word "components" and insert --component,--;

Claim 1, column 25, line 18, please delete the periods (.) after "(A)" and "(B)" and replace them with commas (,); and Claim 1, column 25, lines 22 and 23, please delete the article "a" in both instances.

Signed and Sealed this

Twenty-ninth Day of May, 2001

*Attest:*

NICHOLAS P. GODICI

*Attesting Officer*     *Acting Director of the United States Patent and Trademark Office*